(12) United States Patent
Rains et al.

(10) Patent No.: US 6,522,990 B1
(45) Date of Patent: Feb. 18, 2003

(54) METHODS AND APPARATUS FOR REDUCING TEMPERATURE OVERSHOOT

(75) Inventors: Mark A. Rains, Fairfield, OH (US); Sean P. Harper, Cincinnati, OH (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/454,705

(22) Filed: Dec. 3, 1999

(51) Int. Cl.$^7$ .................... G01K 3/00; G01K 13/02
(52) U.S. Cl. ................. 702/130; 702/132; 374/145; 374/169
(58) Field of Search ................. 702/130, 132, 702/136; 73/116, 117.1, 117.2, 117.3, 117.4, 118.1; 374/144, 145, 169

(56) References Cited

U.S. PATENT DOCUMENTS

| | | | |
|---|---|---|---|
| 3,956,883 A | | 5/1976 | Anderson et al. |
| 4,044,554 A | | 8/1977 | West |
| 4,164,033 A | * | 8/1979 | Glennon et al. ............ 364/431 |
| 4,225,306 A | * | 9/1980 | Wick ............................ 432/24 |
| 4,502,043 A | * | 2/1985 | Moore ........................ 340/588 |
| 4,549,180 A | * | 10/1985 | Masuda ................. 340/870.04 |
| 4,809,500 A | * | 3/1989 | Roberts, Jr. ................... 60/235 |
| 5,050,110 A | * | 9/1991 | Rott ............................ 364/557 |
| 5,080,496 A | * | 1/1992 | Keim et al. .................. 374/144 |
| 5,732,546 A | | 3/1998 | Pineo et al. |
| 5,835,885 A | * | 11/1998 | Lin ............................... 702/99 |
| 5,895,117 A | * | 4/1999 | Wuertenberger ............ 374/142 |
| 5,926,778 A | * | 7/1999 | Poppel ........................ 702/130 |
| 6,076,964 A | * | 6/2000 | Wu et al. .................... 374/141 |
| 6,139,425 A | * | 10/2000 | Yazici et al. ................ 454/261 |
| 6,141,979 A | * | 11/2000 | Dunlap ....................... 61/176.6 |
| 6,207,936 B1 | | 3/2001 | de Waard et al. |
| 6,247,896 B1 | * | 6/2001 | Auxier et al. ................. 416/97 |

* cited by examiner

Primary Examiner—Marc S. Hoff
Assistant Examiner—Paul Kim
(74) Attorney, Agent, or Firm—Rodney M. Young; Armstrong Teasdale LLP

(57) ABSTRACT

Methods and apparatus for reducing temperature overshoot in an engine, such as in a gas turbine aircraft engine, are described. In an exemplary embodiment, an unmeasured temperature to be regulated in an engine is determined by measuring a temperature in the engine wherein the measured temperature being related to the unmeasured temperature, determining a bias of the measured temperature wherein the bias being an amount estimated to be a difference between the measured temperature and a steady state measured temperature and adding the bias to the measured temperature to restore the relationship between measured and unmeasured temperature so that the unmeasured temperature may be properly regulated. The bias is determined using a heat transfer model.

9 Claims, 3 Drawing Sheets

METHODS AND APPARATUS FOR REDUCING TEMPERATURE OVERSHOOT

STATEMENT REGARDING FEDERALLY SPONSORED RESEARCH & DEVELOPMENT

The government has rights in this invention pursuant to Contract No. F33657-97-C0016 awarded by the Department of the Air Force.

BACKGROUND OF THE INVENTION

This invention relates generally to turbine engines and, more particularly, to reducing temperature overshoot in such engines.

In a closed system, an unmeasured temperature sometimes is regulated by a related and measured temperature. The characteristics of the unmeasured temperature differ from the measured temperature as a result of differences in thermal constants, flow fields, and thermal time constants of the measured temperature medium. As a result, the unmeasured temperature may exceed a pre-defined maximum temperature or fall below a pre-defined minimum temperature.

To maintain an unmeasured temperature within a pre-defined range, anticipation methods can be utilized. Generally, anticipation methods attempt to reduce temperature overshoot following a rapid change in temperature. Such anticipation methods sometimes are referred to as rate-based lead-lag anticipation. An amount, or magnitude, of measured temperature anticipation is dependent upon the rate at which the measured temperature signal changes. Thermal states are not taken into account when determining an amount of anticipation. Therefore, the same anticipation is utilized for both cold and warm thermal states.

As a result, too much anticipation may be provided for a warm thermal state and too little anticipation may be provided for a cold thermal state. For a cold thermal state, the anticipation decays in a matter of seconds when the temperature overshoot can last for a much greater time (e.g. longer than one minute).

As one specific example, and in at least one known gas turbine aircraft engine, a gas temperature T41 overshoot occurs when the gas temperature T41 is controlled by a measured high pressure turbine (HPT) metal temperature T4B. The gas temperature T41 overshoot following a cold burst from idle to full power decays over a span of one minute. The T41 overshoot characteristic is caused by a changing relationship between the measured T4B metal temperature and actual T41 gas temperature. The relationship between the T41 and T4B temperatures is altered as a result of the greater cooling effectiveness of HPT blades when the engine bore is cool (heat-soak) at idle as compared to when the rotor is warm at full power. When the engine is cool, the HPT cooling air releases heat to various metals as it passes through the engine bore. The cooled air biases the T4B measurement low and allows the unmeasured T41 gas temperature to increase. Component life can be extended, and life cycle cost can be reduced, by reducing such overshoot.

BRIEF SUMMARY OF THE INVENTION

Methods and apparatus for reducing temperature overshoot in an engine, such as in a gas turbine aircraft engine, are described. In an exemplary embodiment, an unmeasured temperature to be regulated in an engine is regulated by measuring a temperature in the engine wherein the measured temperature being related to the unmeasured temperature, determining a bias of the measured temperature wherein the bias being an amount estimated to be a difference between the measured temperature and the measured temperature without cooling air beat-soak (e.g. steady state), and adding the bias to the measured temperature to restore the relationship between measured and unmeasured temperature so that the unmeasured temperature may be properly regulated by the measured temperature and estimated steady state measured temperature. The bias is determined using a heat transfer model. By using a heat transfer model to determine the bias, and then adjusting the measured temperature based on the bias, temperature overshoot can at least be reduced to facilitate extending component life and reducing life cycle costs.

DETAILED DESCRIPTION OF THE INVENTION

Figure 1:
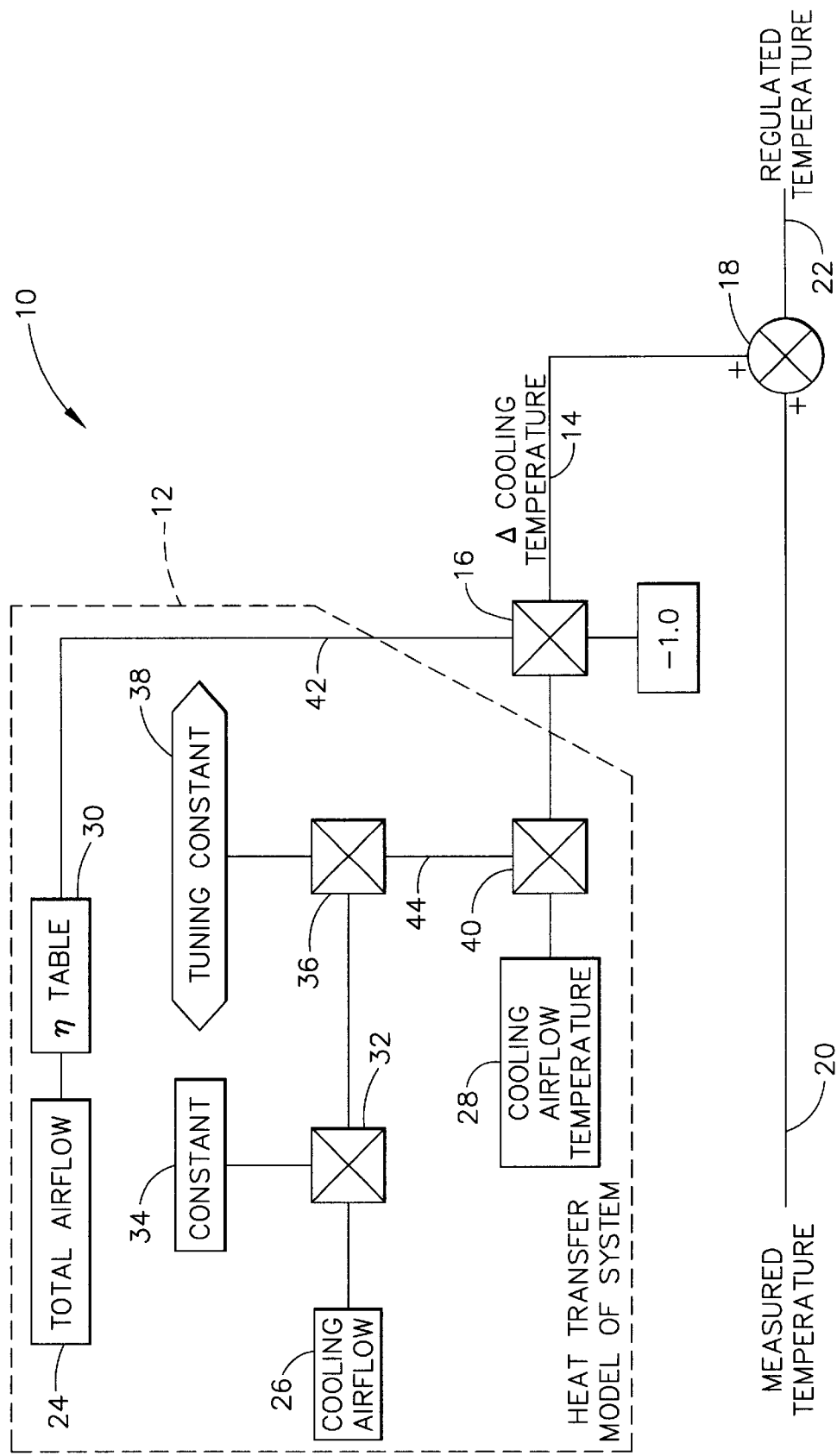
FIG. 1 is a flow diagram of a simplified anticipation algorithm.

FIG. 1 is a flow diagram of an exemplary anticipation system 10. System 10 includes a heat transfer model 12. A delta cooling temperature 14 is generated by multiplying 16 an output of model 12 by negative one. Delta cooling temperature 14 is then added 18 to the measured temperature 20 to generate a regulated temperature 22. Regulated temperature 22 is then input to a temperature regulator (not shown) and utilized to maintain the unmeasured temperature within a selected range.

Model 12 is configured to generate a heat transfer factor. The heat transfer factor is generated using total airflow 24, cooling airflow 26, and cooling airflow temperature 28 as inputs. Specifically, total airflow 24 is supplied to a lookup table 30 to determine a cooling air effectiveness 42. Cooling airflow 26 is multiplied 32 by a constant 34, and the product is then multiplied 36 by a tuning constant 38 to get an airflow product 44. Tuning constant 38 is lumped heat transfer coefficients. Cooling airflow temperature 28 is multiplied 40 by airflow product 44 and the resulting product is multiplied 16 by cooling air effectiveness 42 to generate a metal temperature bias. The metal temperature bias is also multiplied 16 by negative one as described above.

Although one specific embodiment of a heat transfer model is described above, many different heat transfer models could be utilized depending upon the particular cooling/heating adjustment to be made to a measured temperature relative to an unmeasured temperature. Generally, by using a heat transfer model to determine a delta cooling temperature, and then adjusting the measured temperature based on the delta cooling temperature, temperature overshoot can at least be reduced to facilitate extending component life and reducing life cycle costs.

Figure 2:
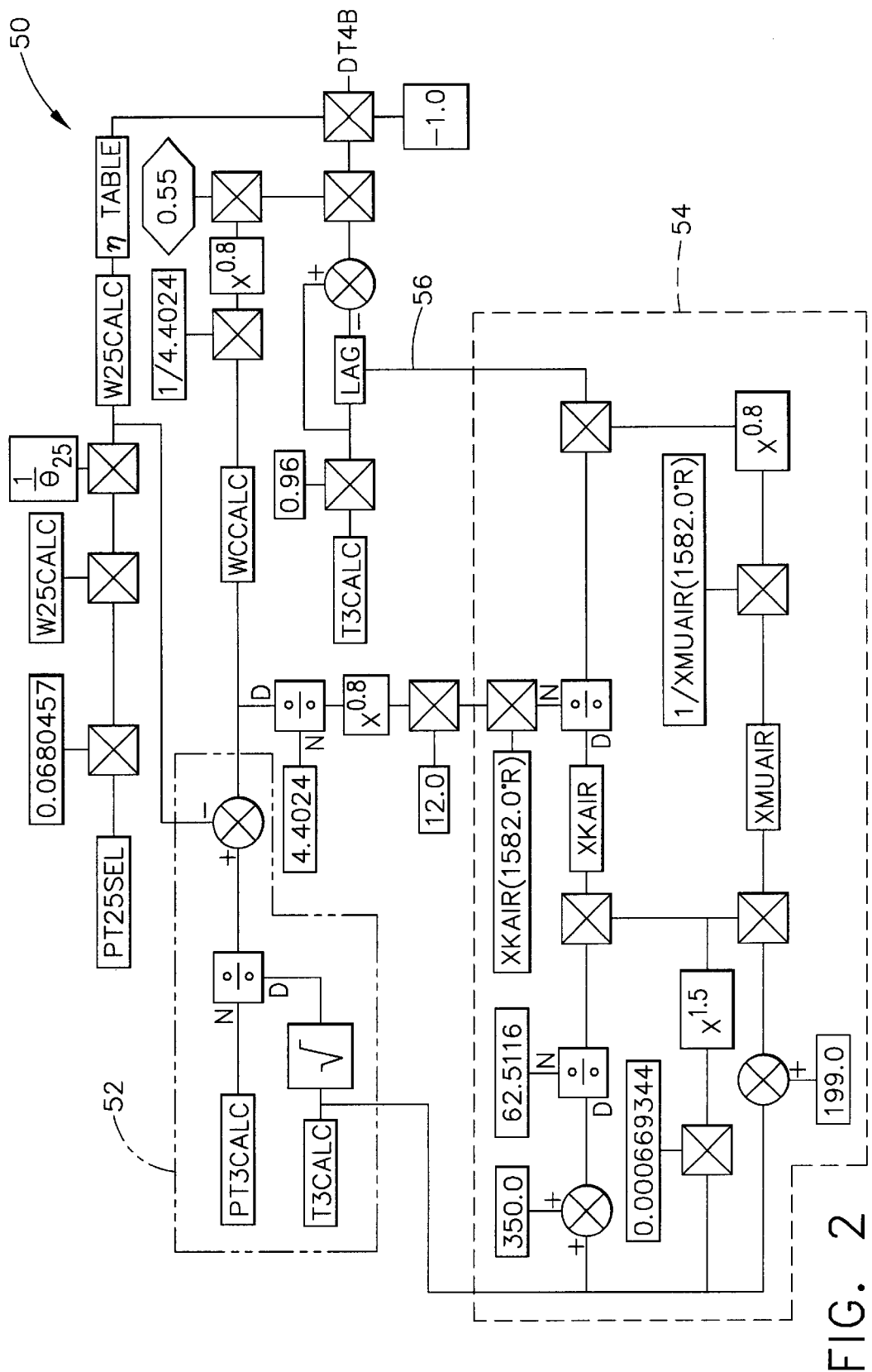
FIG. 2 is an example flow diagram of an anticipation algorithm for determining a cooling factor due to heat-soak.

FIG. 2 illustrates a flow diagram of a specific heat transfer model 50 for determining a DT4B cooling factor due to heat-soak. The DT4B cooling factor is then added to the measured T4B temperature for input to a temperature regulator.

More specifically, the logic of model 50 predicts cooling air heat-soak and determines the anticipation for the T4B regulator. The HPT blade temperature (T4B) is used to regulate the flow path gas temperature (T41). The relationship between T4B and T41 is changed by the cooling air heat-soak, or bias. Estimating the cooling air heat-soak bias improves the T4B anticipation and decreases T41 overshoot. The logic of model 50 generates an anticipation that accounts for the cooling air heat-soak. Also, with the heat-soak based anticipation logic, thrust overshoot for a cold rotor burst or undershoot when too much anticipation is present such as a hot rotor burst are reduced and thrust quickly settles in at a steady state level.

The logic of model 50 also provides cold-rotor anticipation while eliminating over anticipation on a hot-rotor re-burst. Specifically, a cold-rotor burst occurs during take-off and go around. During this time, the bore of the engine is cool. The cooling air for the HPT turbine blade passes through the cool engine bore and gives up heat to the exposed metal. The cooled air biases the T4B temperature low.

A hot-rotor re-burst occurs while the bore of the engine is still warm when power level angle is increased. Because there is little difference between the bore metal and cooling air temperature, the relationship between T41 and T4B is only affected slightly. Logic of model 50 recognizes this situation and applies only a small anticipation. As a result, the overshoot is reduced to a spike that very quickly fades to almost steady state. With T41 properly regulated, thrust overshoot and "engine rollback" are reduced, providing near steady-state levels.

Calculated values supplied to model are W25RCALC, PIT3CALC, and T3CALC. A model 100 for determining these calculated is described below. Model utilizes these calculated values, as well as a selected value, i.e., PT25SEL, to determine the DT4B cooling factor.

To reduce complexity and fault accommodation considerations, it is desirable to reduce complexity of model 50. Boxes 52 and 54 in FIG. 2 illustrate processing that can be eliminated through simplification. For example, the complex cooling airflow calculation may be replaced with the engine total airflow multiplied by a scalar. Use of this simple expression eliminates the T3/P3 functionality and the need for the calculated value for P3.

Also, Taudisk 56 is a time constant for the bore metal such as the turbine shafts, rotors, and other metals in the cooling flowpath, and the complex expression is a function of the heat transfer coefficients of air, density of air, cooling airflow, and effective masses. A simplified method of making the calculation reduces to just a function of cooling airflow, which reduces computational complexity by eliminating fractional exponents.

Further, tuning constant 38 where $hA/mc_p$ equals approximately 0.55 is used in determining the temperature of the cooling air (where h is a convection heat transfer coefficient, A is heat transfer area, m is mass, and $c_p$ is specific heat.) This constant has the largest influence of any curve or constant. This constraint may be used to adjust T4B anticipation to balance between T41 overshoot, acceleration times, and thrust rollback.

Figure 3:
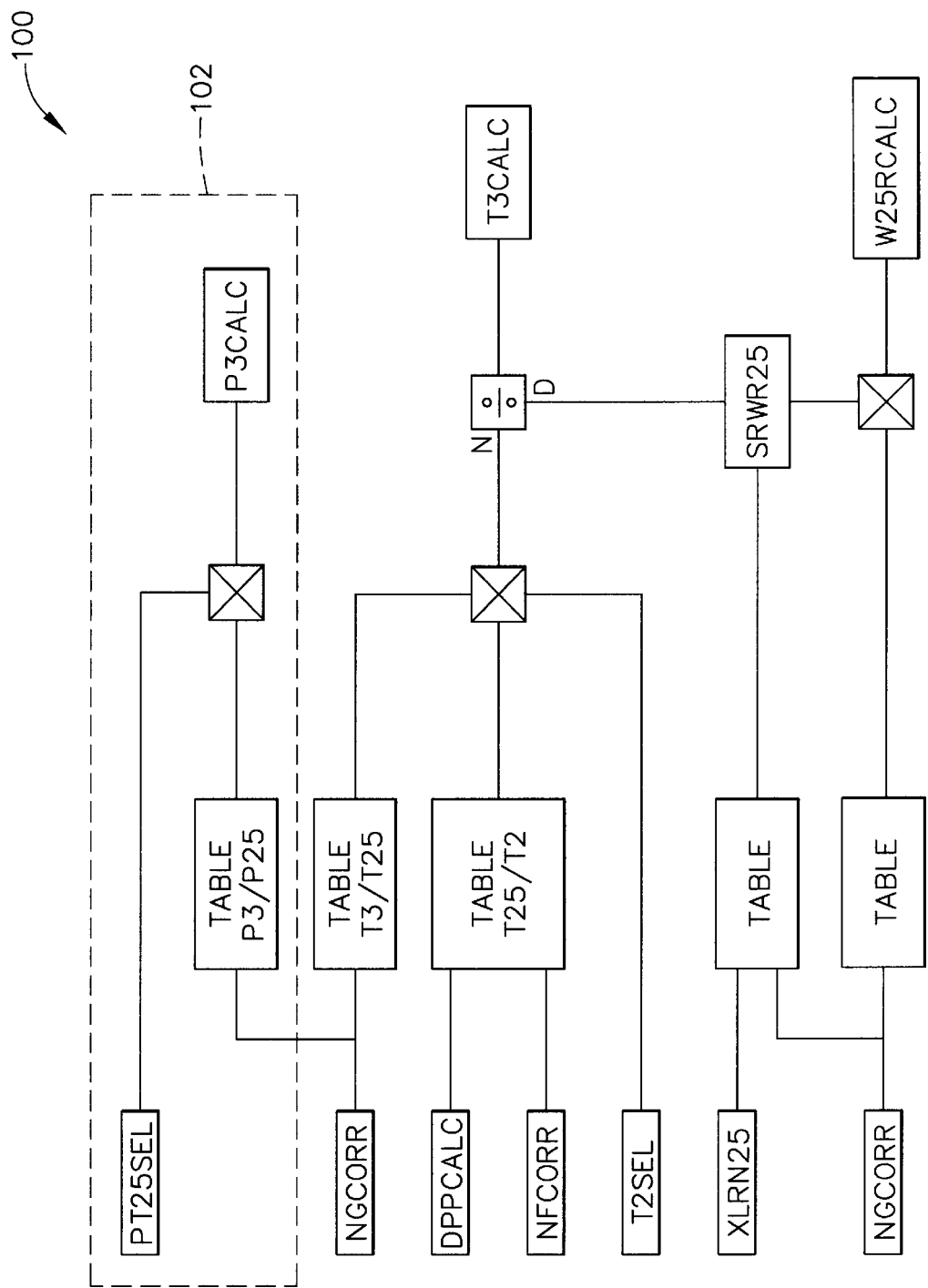
FIG. 3 is a flow diagram for determining P3CALC, T3CALC, and W25CALC values used in the flow diagram shown in FIG. 2.

FIG. 3 is a flow diagram for determining P3CALC, T3CALC, and W25CALC values used in the flow diagram shown in FIG. 2. A box 102 in FIG. 3 identifies processing that can be eliminated through simplification of model shown in FIG. 2.

In one embodiment, the models described above are implemented in an on-board engine control computer including a processor. The processor is programmed to execute each step as described above. The engine control computer also includes a non-volatile memory (NVM). Adjustments for tuning parameters can be stored and easily adjusted in the NVM.

For engines installed in the field, and once the models are loaded into the engine control computer, the original anticipation algorithms can remain in the computer and a master disable can also be provided in the NVM so that the control laws can revert to existing algorithms in the event that such reversion is required or in the event of input signal faults that make the anticipation model invalid. Providing a NVM switch to choose between the above described models and the existing logic is beneficial in that if needed, the existing logic can be used without a software build. In addition, thrust asymmetry issues can be eliminated by disabling or enabling the above described models to better balance the thrust of the aircraft.

Also, and with respect to a core speed (NG) sensor failure, T41 gas temperature increases and then settles to a steady state value equivalent to a good sensor. An intermittent NG signal and a T41 transient upon a failed NG signal is undesirable and may cause thrust perturbations. Therefore, the NG signal should be latched to a default value once a failed signal is detected to prevent a NG signal from being used if it becomes good again Further, a core speed (NG) sensor failure has an undesired result under transient conditions and sensor failure. Upon a cold-rotor burst from idle to max power, the T41 overshoot increases for a brief period and steady-state T41 is concurrent with a good sensor.

While the invention has been described in terms of various specific embodiments, those skilled in the art will recognize that the invention can be practiced with modification within the spirit and scope of the claims.

What is claimed is:

1. A method for determining an unmeasured temperature to be regulated in an engine, said method comprising the steps of:

measuring a temperature in the engine;

determining a bias of the measured temperature using at least one of an engine cooling airflow and an engine cooling airflow temperature, the bias being an amount estimated to be a difference between the measured temperature and a measured temperature absent bias caused by engine thermal state, or cooling air heat-soak;

adding the bias to the measured temperature to estimate the steady state measured temperature; and determining a temperature of cooling air using a cooling airflow constant.

2. A method in accordance with claim 1 wherein determining the bias comprises the step of utilizing a heat transfer model to generate a heat transfer factor.

3. A method in accordance with claim 2 wherein the heat transfer factor is generated using at least one of total airflow, cooling airflow, and cooling airflow temperature as inputs to the model.

4. A method in accordance with claim 2 wherein in the model, cooling airflow is determined by multiplying engine total airflow by a scalar.

5. A method in accordance with claim 2 wherein in the model, a Taudisk value is determined based on cooling airflow.

6. A processor programmed to determine an unmeasured temperature to be regulated in an engine, said processor programmed to perform the steps of:

determine a magnitude of a measured temperature in the engine;

determine a bias of the measured temperature using at least one of an engine cooling airflow and an engine cooling airflow temperature, the bias being an amount estimated to be a difference between the measured temperature and a steady state measured temperature without cooling air heat-soak;

add the bias to the measured temperature to estimate the steady state measured temperature; and determine a temperature of cooling air using a cooling airflow constant.

7. A processor in accordance with claim 6, wherein to determine the bias, said processor is programmed to execute a heat transfer model to generate a heat transfer factor.

8. A processor in accordance with claim 7 wherein in the model, cooling airflow is determined by multiplying engine total airflow by a scalar.

9. A processor in accordance with claim 7 wherein in the model, a Taudisk value is determined based on cooling airflow.

* * * * *

UNITED STATES PATENT AND TRADEMARK OFFICE
CERTIFICATE OF CORRECTION

PATENT NO. : 6,522,990 B1  Page 1 of 1
DATED : February 18, 2003
INVENTOR(S) : Rains et al.

It is certified that error appears in the above-identified patent and that said Letters Patent is hereby corrected as shown below:

Column 2,
Line 5, delete "beat-soak" and insert therefor -- heat-soak --.

Column 3,
Line 2, delete "beat-soak" and insert therefor -- heat-soak --.
Line 32, delete "PIT3CALC" and insert therefor -- PT3CALC --.
Line 33, after "calculated" insert -- values --.

Column 4,
Line 25, after "again" insert a period -- . --.

Signed and Sealed this

Twenty-ninth Day of July, 2003

JAMES E. ROGAN
*Director of the United States Patent and Trademark Office*